(12) United States Patent
Spychalla et al.

(10) Patent No.: US 6,910,781 B2
(45) Date of Patent: Jun. 28, 2005

(54) QUICK RELEASE VEHICLE MIRROR

(75) Inventors: Leo T. Spychalla, Watertown, WI (US); Dan H. Schneider, Franklin, WI (US)

(73) Assignee: Velvac, Inc., New Berlin, WI (US)

( * ) Notice: Subject to any disclaimer, the term of this patent is extended or adjusted under 35 U.S.C. 154(b) by 0 days.

(21) Appl. No.: 10/394,680

(22) Filed: Mar. 21, 2003

(65) Prior Publication Data

US 2004/0001262 A1 Jan. 1, 2004

Related U.S. Application Data

(60) Provisional application No. 60/391,559, filed on Jun. 26, 2002.

(51) Int. Cl.[7] .............................. B60R 1/06; F16B 2/02
(52) U.S. Cl. ...................... 359/872; 359/876; 359/881; 359/900; 248/479; 248/480; 248/487; 403/55; 403/59; 403/84; 403/87
(58) Field of Search ................................. 359/900, 842, 359/875, 876, 881, 872; 403/24, 25, 55, 57, 59, 84, 86, 87, 88, 110; 248/476, 479, 480, 485, 486, 487

(56) References Cited

U.S. PATENT DOCUMENTS

| | | | |
|---|---|---|---|
| 369,143 A | * 8/1887 | White | ........................ 403/55 |
| 1,362,856 A | 12/1920 | Drake | |
| 2,057,611 A | 10/1936 | Fischer | |
| 2,109,142 A | 2/1938 | Rosen | |
| 2,121,144 A | 6/1938 | Fischer | |
| D112,268 S | 11/1938 | Anderson | |
| D117,072 S | 10/1939 | Morley | |
| D119,239 S | 2/1940 | Morley | |
| 2,248,833 A | 7/1941 | Thibault et al. | |
| 2,357,815 A | 9/1944 | Fischer | |
| 2,411,421 A | 11/1946 | Golden | |
| 2,475,502 A | * 7/1949 | Holmes | ..................... 248/201 |

(Continued)

FOREIGN PATENT DOCUMENTS

| | | | |
|---|---|---|---|
| DE | 2050017 | * | 4/1972 |
| DE | 39 30 103 A1 | * | 3/1991 |
| FR | 2565175 A3 | * | 3/1985 |
| GB | 2100205 A | * | 12/1982 |
| WO | WO 92/03309 A1 | * | 3/1992 |

OTHER PUBLICATIONS

Advertisement published in Oct. 1999 entitled "Take good care of my baby.", showing a mirror mount.
RoadSTAR 75 article by Andrew Ryder, dated Jul. 1999, 1 page.
Velvac 2001 Product Catalog, pp. 3–31, dated 2001.

Primary Examiner—John Juba, Jr.
(74) Attorney, Agent, or Firm—Michael Best & Friedrich LLP (57) ABSTRACT

A mirror assembly for a vehicle is securable to a tubular member that defines a central axis and is secured to the vehicle. The mirror assembly comprises a clamping assembly including a concave surface that is engagable with the tubular member. A housing is coupled to the clamping assembly and supports a mirror. A latching assembly engages the clamping assembly and the housing and is movable between a latched position and an unlatched position. In the latched position, the housing is held substantially fixed with respect to the tubular member. In the unlatched position, the clamping assembly is movable in a direction substantially parallel to the central axis and is pivotable about the central axis, and the housing is pivotable with respect to the clamping assembly about a pin axis that is substantially perpendicular to the central axis.

23 Claims, 5 Drawing Sheets

U.S. PATENT DOCUMENTS

| | | | |
|---|---|---|---|
| 2,483,289 A | 9/1949 | Martin | |
| D162,098 S | 2/1951 | Vacanti | |
| 2,552,074 A | 5/1951 | Thompson | |
| 2,663,224 A | 12/1953 | Younglove | |
| 2,724,996 A | 11/1955 | O'Shei | |
| 2,783,015 A * | 2/1957 | Kampa | 248/480 |
| 2,854,893 A | 10/1958 | Henshall | |
| 3,955,829 A | 5/1976 | Bussler | |
| 4,187,702 A | 2/1980 | Benton | |
| D259,716 S | 6/1981 | Watanabe | |
| 4,281,815 A | 8/1981 | O'Connell et al. | |
| 4,368,868 A | 1/1983 | Urban | |
| 4,433,899 A | 2/1984 | Sellet et al. | |
| 4,441,682 A | 4/1984 | Su | |
| 4,523,735 A | 6/1985 | Beck et al. | |
| D291,148 S | 8/1987 | Rizzo | |
| 4,715,701 A | 12/1987 | Urban | |
| 4,755,033 A * | 7/1988 | Whitehead et al. | 248/483 |
| D304,710 S | 11/1989 | Sharp | |
| D306,568 S | 3/1990 | McMurtrey | |
| 5,028,029 A | 7/1991 | Beck et al. | |
| 5,198,938 A | 3/1993 | Ward | |
| 1,905,623 A | 4/1993 | Deitz | |
| D350,089 S | 8/1994 | Greenfield | |
| D363,694 S | 10/1995 | Birgel | |
| 5,507,584 A * | 4/1996 | Sassmannshausen et al. | 403/78 |
| 5,576,899 A | 11/1996 | Englander | |
| D387,317 S | 12/1997 | Lang | |
| D395,266 S | 6/1998 | Phillips | |
| 5,769,379 A | 6/1998 | Englander et al. | |
| 5,823,501 A | 10/1998 | Schmidt et al. | |
| D402,949 S | 12/1998 | Marguerie | |
| D408,340 S | 4/1999 | Phillips | |
| 6,027,133 A | 2/2000 | Phillips | |
| 6,092,778 A | 7/2000 | Lang et al. | |
| D431,508 S | 10/2000 | Matsumoto et al. | |
| 6,302,549 B1 * | 10/2001 | Branham et al. | 359/871 |
| D460,393 S | 7/2002 | Kidd | |
| D462,305 S | 9/2002 | Abalos et al. | |
| D466,455 S | 12/2002 | Kidd et al. | |

* cited by examiner

QUICK RELEASE VEHICLE MIRROR

CROSS-REFERENCE TO RELATED APPLICATION

This application claims priority under 35 U.S.C. § 119 to provisional patent application No. 60/391,559, filed on Jun. 26, 2002.

FIELD OF THE INVENTION

The invention relates to supports, and more particularly to a mounting bracket for a vehicle mirror mounting system.

BACKGROUND INFORMATION

Safety mirrors, such as rearview mirrors for vehicles, are well known. These mirrors often provide the operator of the vehicle with a view of the areas behind or alongside the vehicle. It is generally preferred that safety mirrors be adjustable to accommodate vehicle operators of varying size and stature. Many devices and techniques for adjustably mounting safety mirrors to vehicles have been developed and are well known in the art.

On certain larger road going vehicles (e.g., delivery vans, straight trucks, tractor-trailer combinations, and the like), the safety mirrors are used extensively when the vehicle is backed into a loading dock or other area for the loading and unloading of items from the vehicle. Therefore, an easily adjustable yet robust mirror mounting system is particularly desirable. One example of a known mirror mounting system includes mirrors mounted on round tubes that are secured to the vehicle body. Each mirror and its associated mounting structure is adapted to provide adjustment in three directions. In a first aspect, the mirror is movable along the length of the tube in a direction that is generally parallel to the central axis of the tube, thereby adjusting the overall height of the mirror. In a second aspect, the mirror can be pivoted about the central axis of the tube, and in a third aspect, the mirror can be pivoted about a pivot axis that is substantially perpendicular to the central axis of the tube. Mounting the mirror in this way provides a wide range of mirror adjustment that generally accommodates a variety of operators.

Several conventional mirror assemblies can provide the preferred mirror mounting arrangement including providing adjustment in the three mirror adjustment directions. Many conventional mirror assemblies require hand tools such as screwdrivers or wrenches to loosen the mirror assembly from the mounting tubes for adjustment, thereby significantly complicating mirror adjustment. Additionally, once the mirror is properly adjusted, the tools are used to secure the mirror assembly in place. During the tightening process, care must be taken to prevent the mirror from moving and disturbing the position adjustments.

SUMMARY OF THE INVENTION

In view of the forgoing, it is apparent that a mirror mounting assembly that provides adjustability in at least three directions without requiring the use of tools is desirable. One of the problems associated with known mirror mounting systems is that hand tools are required to make mirror position adjustments. This problem becomes particularly cumbersome when the same vehicle is often driven by different operators, a situation that necessitates repeated mirror position adjustments.

To address these concerns with known mirror mounting systems, the present invention provides a mirror assembly for a vehicle. The mirror assembly is securable to a tubular member that defines a central axis and is secured to the vehicle. The mirror assembly comprises a clamping assembly, including a concave surface that is engagable with the tubular member. A housing is coupled to the clamping assembly and supports a mirror. A latching assembly engages the clamping assembly and the housing and is movable between a latched position and an unlatched position. In the latched position, the housing is held substantially fixed with respect to the tubular member. In the unlatched position, the clamping assembly is movable in a direction substantially parallel to the central axis of the tubular member and is pivotable about the central axis, and the housing is pivotable with respect to the clamping assembly about a pivot axis that is substantially perpendicular to the central axis.

The clamping assembly may include a first clamp and a second clamp pivotally coupled to each other along a clamp axis that is substantially parallel to and spaced from the central axis. Preferably, the first concave surface extends into the first clamp and the second clamp defines a second concave surface. In this manner, the first and second concave surfaces can cooperate to surround and frictionally engage the tubular member when the latching member is in the latched position. An elongated locking member extends through the clamping assembly and has a first end pivotally coupled to the latch and a second end coupled to the housing.

In some aspects, the housing may include a frusto-conical cup and the clamping assembly may include a frusto-conical protrusion. The pivot axis extends axially through the frusto-conical cup and the frusto-conical protrusion and a narrow end of the protrusion engages an inner surface of the cup. When the housing is pivoted with respect to the clamping assembly about the pivot axis, the frusto-conical protrusion pivots about the pivot axis in mating engagement with the frusto-conical retaining member. When the latch assembly is in the latched position, the narrow end lockingly engages the cup and when the latch assembly is in the unlatched position the narrow end pivotably engages the cup.

In some aspects, the latching assembly includes a cam protrusion and the clamping assembly includes a cam recess adapted to cooperate with the cam protrusion. When the latching assembly is moved from the unlatched position toward the latched position the cam protrusion and the cam recess cooperate to engage the concave surface with the tubular member.

The present invention further provides a method of securing a mirror assembly to a vehicle having a tubular member that defines a central axis. The mirror assembly includes a clamping assembly that is engageable with the tubular member. A housing is coupled to the clamping assembly and supports a mirror and a latch assembly. The method includes moving the latch assembly into a latched position and holding the housing substantially fixed with respect to the tubular member and moving the latch assembly into an unlatched position. In the unlatched position, the mirror can be adjusted with respect to the vehicle. When the mirror is adjusted, the clamping assembly is moved in a direction substantially parallel to the central axis, the clamping assembly is pivoted about the central axis, and the housing is pivoted with respect to the clamping assembly about a pivot axis that is substantially perpendicular to the central axis.

Other features and advantages of the invention will become apparent to those skilled in the art upon review of the following description and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 1:
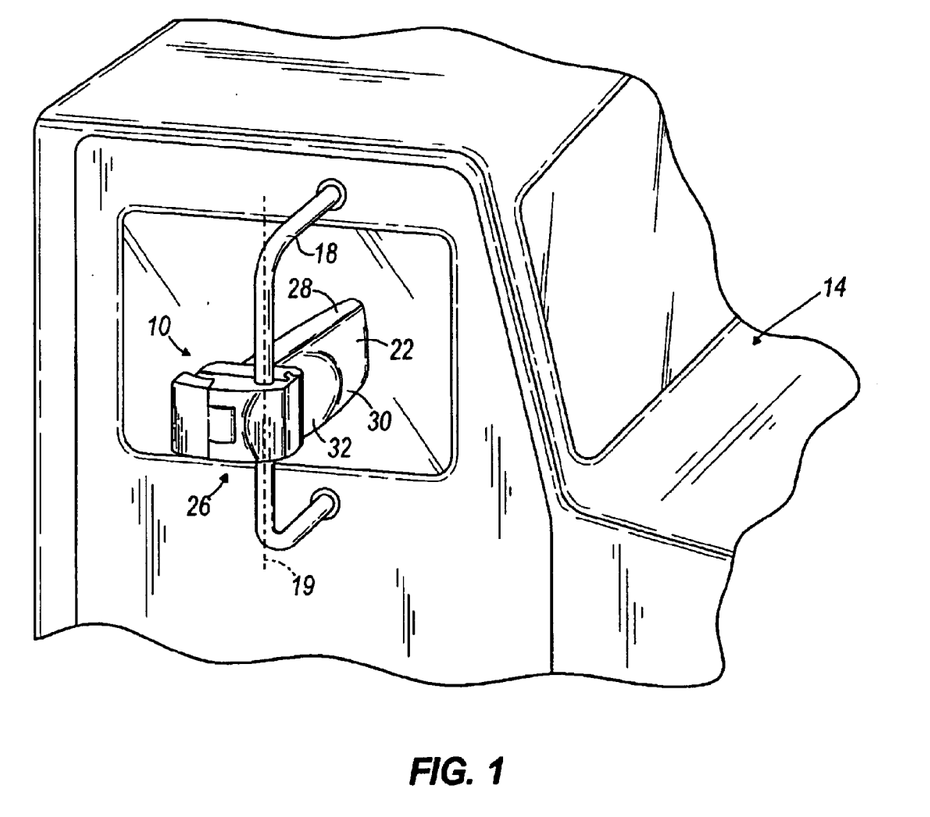
FIG. 1 is a perspective view of a rearview mirror assembly of the present invention installed on a vehicle.
Figure 2:
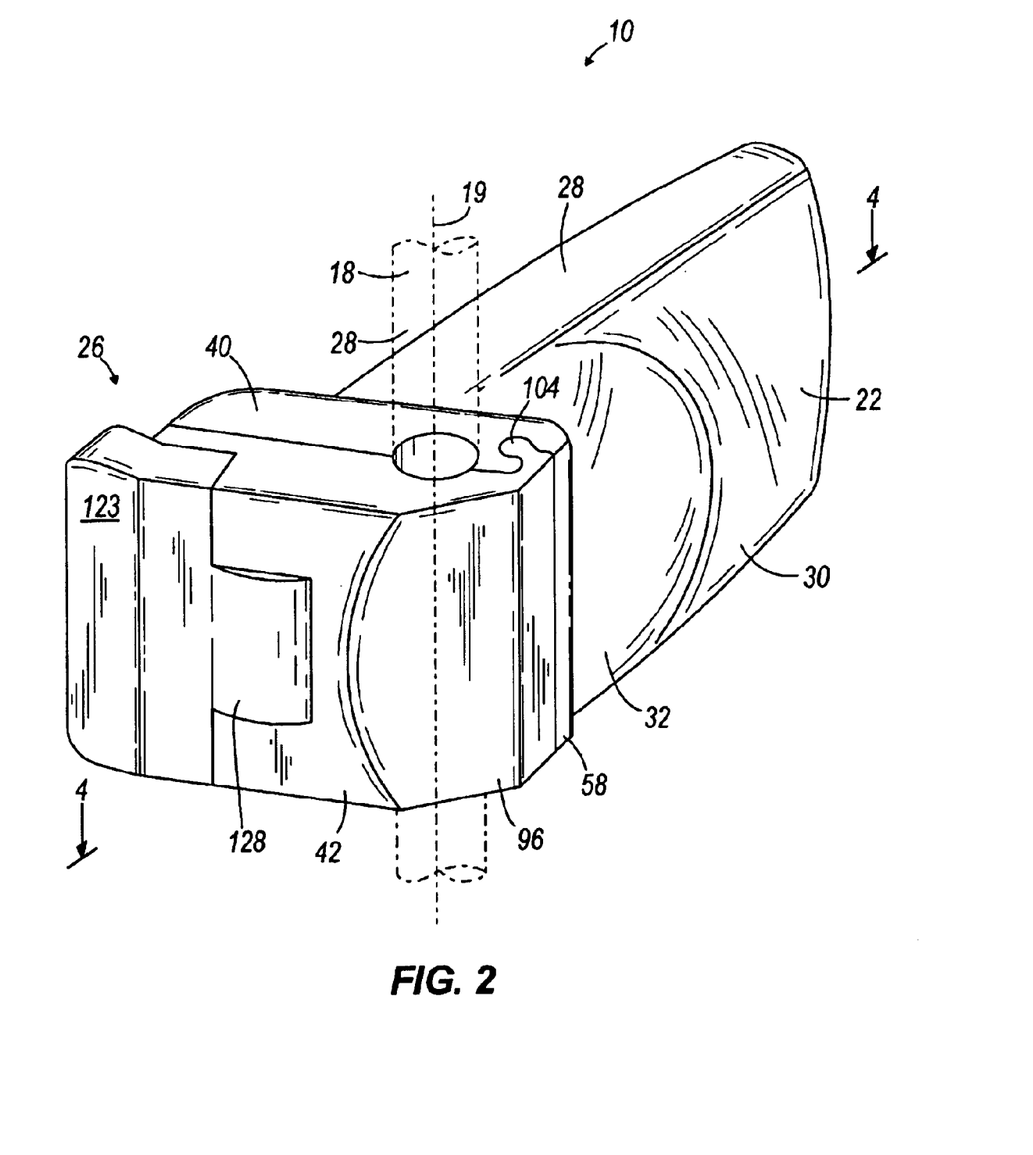
FIG. 2 is an enlarged perspective view of the rearview mirror assembly illustrated in FIG. 1.

FIG. 1 illustrates a quick release mirror assembly 10 of the present invention installed on a road-going vehicle 14 (e.g. a semi-tractor as illustrated, a van, a straight truck, or the like). A length of round tubing 18 defining a central axis 19 is secured to the vehicle 14 in a known manner and the quick release mirror assembly 10 is adjustably secured to the tubing 18, as described below. The illustrated embodiment of the invention discloses a rearview mirror assembly, however other mirror configurations and installation locations (e.g. at the rear of the vehicle) are possible.

Figure 3:
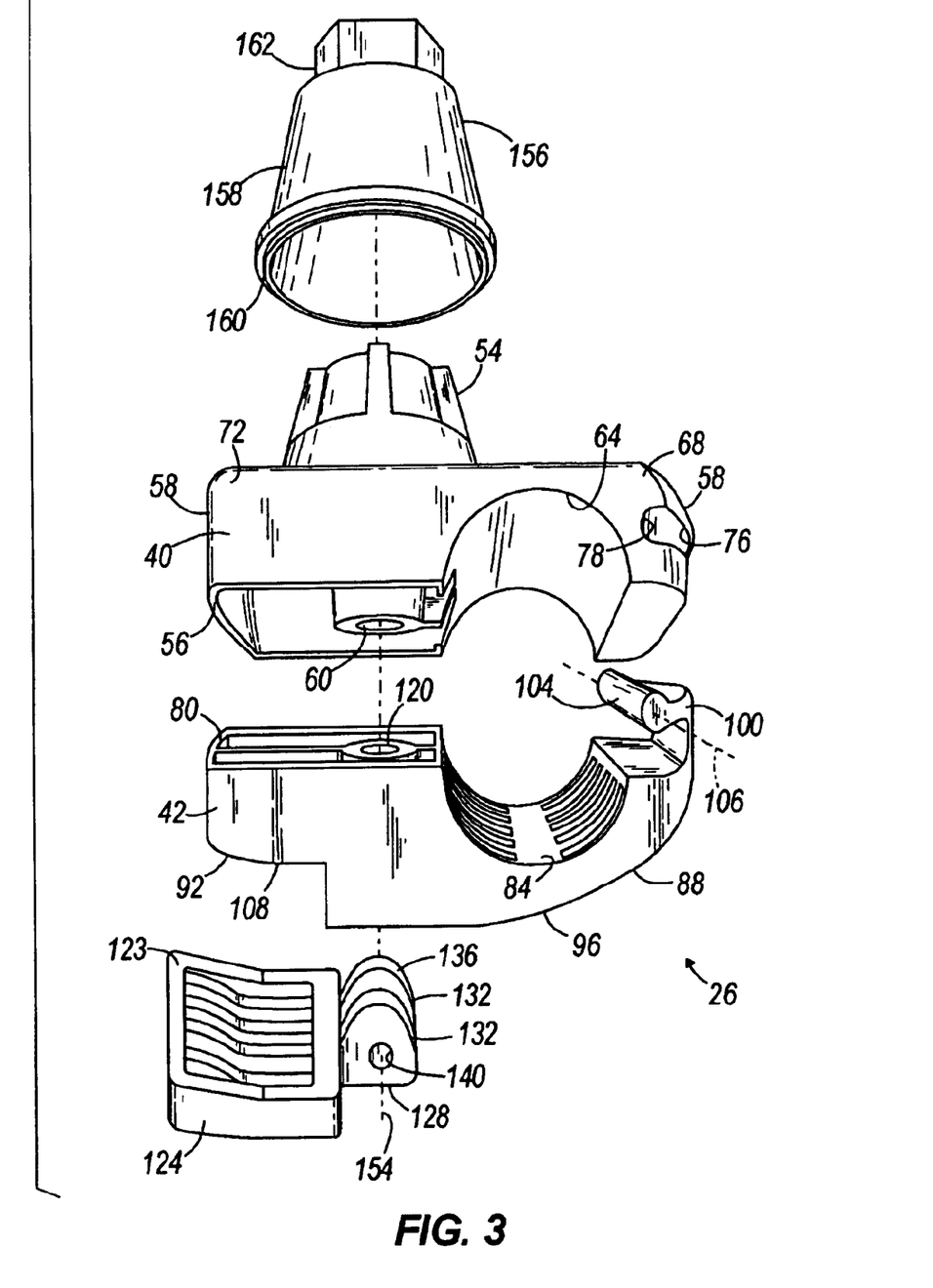
FIG. 3 is an exploded perspective view of the rearview mirror assembly illustrated in FIG. 1.
Figure 4:
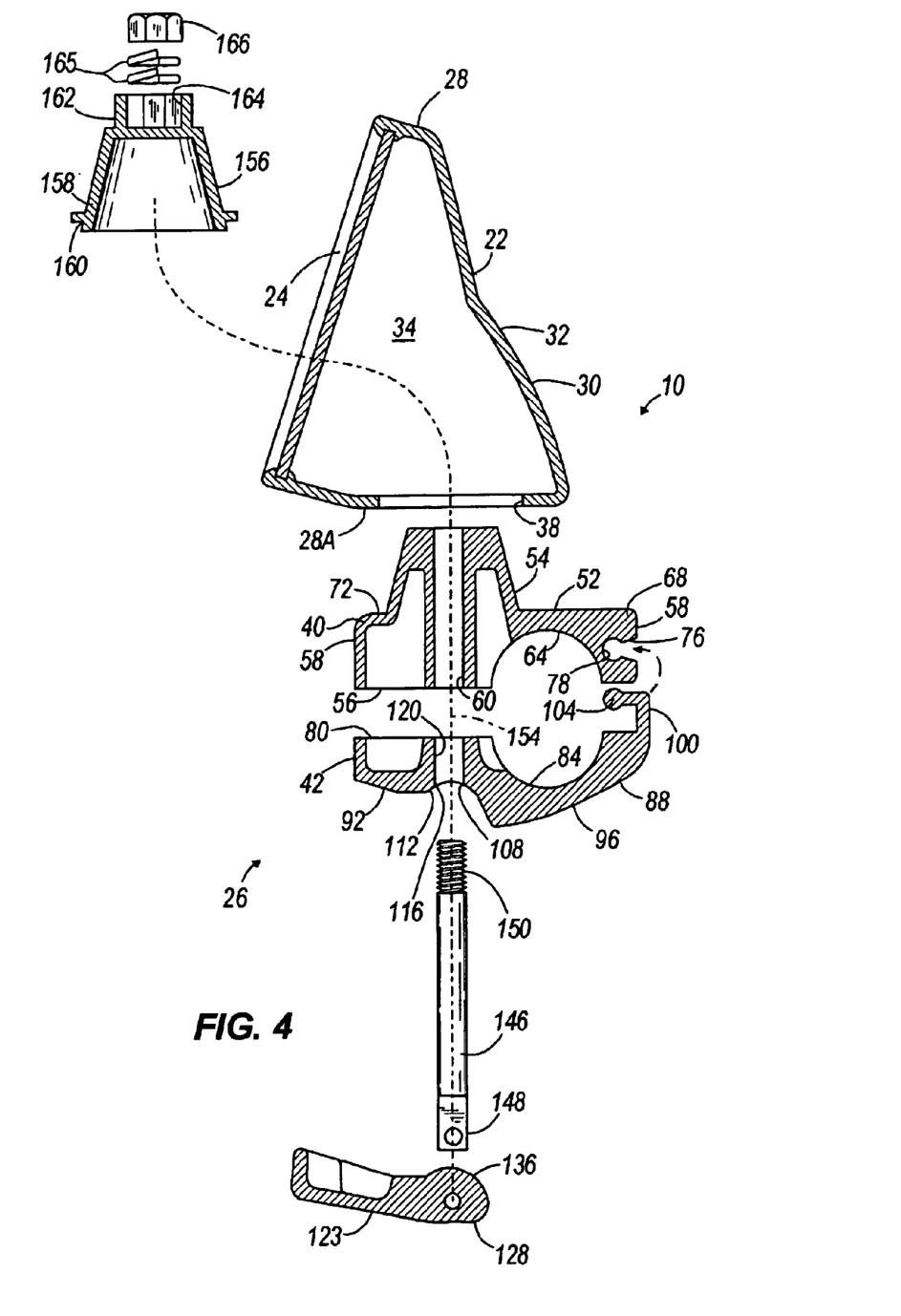
FIG. 4 is an exploded section view taken along line 4—4 of FIG. 2.
Figure 5:
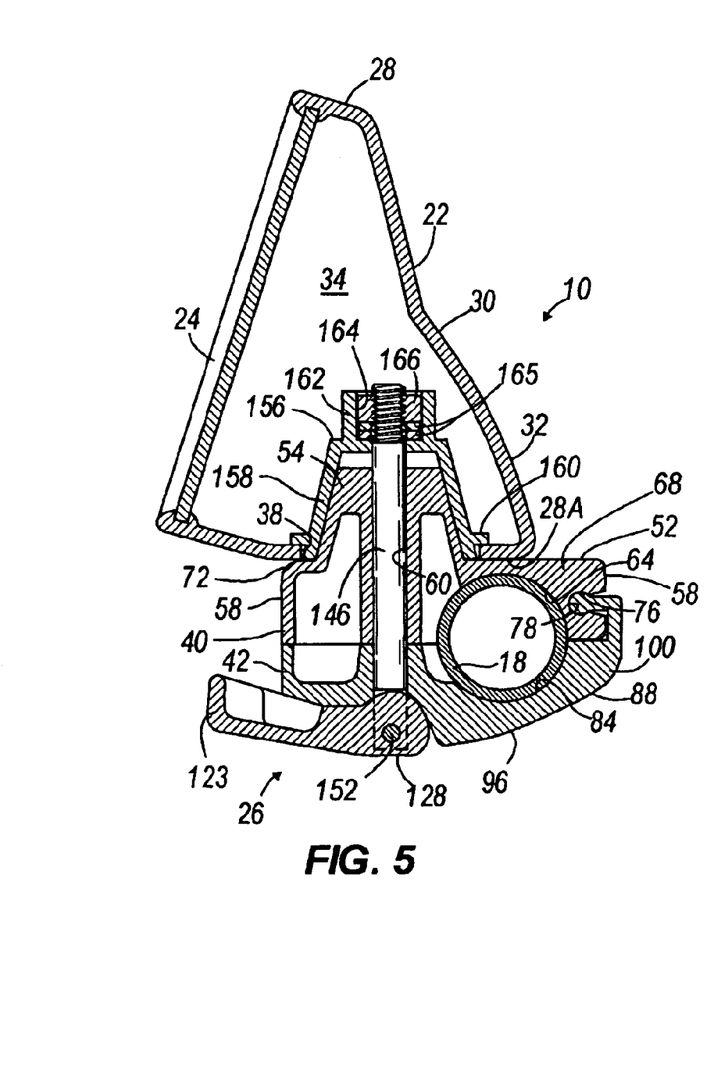
FIG. 5 is an assembled section view, similar to FIG. 4, illustrating the mirror assembly in a clamped position.
Figure 6:
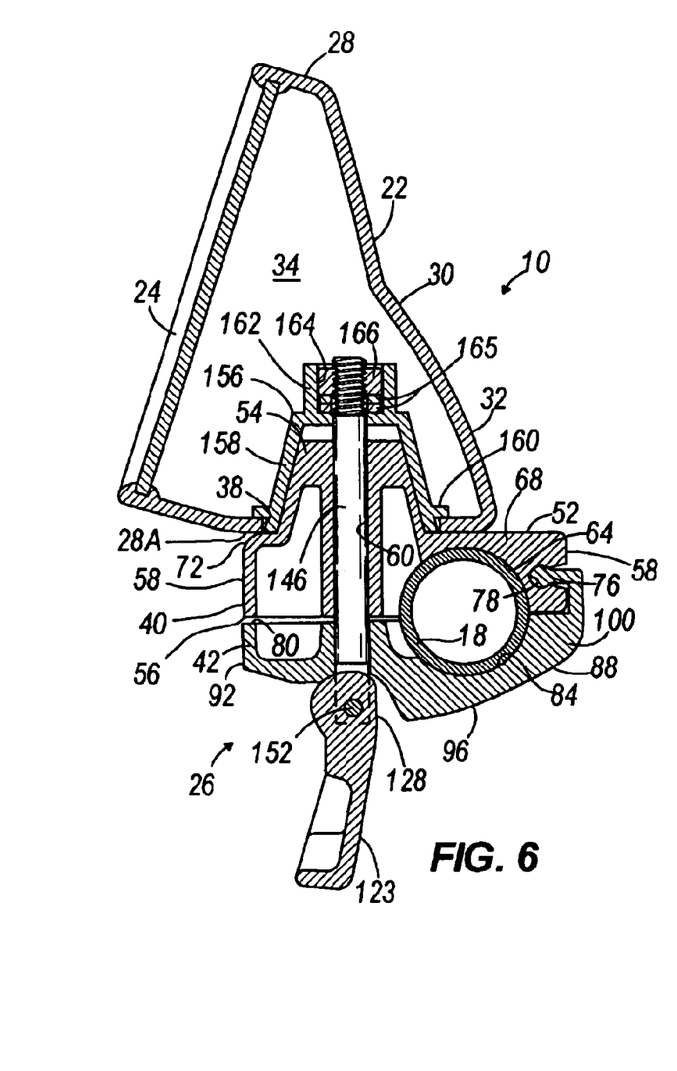
FIG. 6 is an assembled section view, similar to FIG. 4, illustrating the mirror assembly in a released position.

Referring to FIGS. 1–4, the illustrated mirror assembly 10 includes a mirror housing 22 that supports a reflective body or mirror 24, and a clamp assembly 26 that couples the mirror housing 22 to the round tubing 18. The housing 22 is preferably an injection-molded polymer. However, other construction materials and methods are possible. The housing 22 is generally rectangular and includes perimeter walls 28 that surround the mirror 24 and define the generally rectangular shape of the housing 22. Extending between the perimeter walls 28, the housing 22 also includes a contoured wall 30 that faces generally forwardly with respect to the vehicle 14 when the mirror assembly 10 is installed as an external rearview mirror. The contoured wall 30 defines a forwardly-facing, generally V-shaped, convex protrusion 32. Referring to FIGS. 4–6, the mirror 24, the perimeter walls 28, and the contoured wall 30 cooperate to define an inner chamber 34 within the housing 22. One of the perimeter walls 28A shares an edge with the protrusion 32 and defines a generally circular aperture 38 that communicates with the inner chamber 34.

The clamp assembly 26 includes a first clamp or mounting member 40 that is positioned between the housing 22 and the tubing 18, and a second clamp or mounting member 42 that is pivotally coupled to the first mounting member 40. The first and second mounting members or clamps 40, 42 are pivotable with respect to each other to clamp or otherwise snugly engage the tubing 18, thereby securing the mirror assembly 10 to the vehicle 14, as described below in more detail.

The first mounting member 40 includes a substantially planar and generally rectangular mounting surface 52. A frusto-conical protrusion 54 extends from the mounting surface 52 and is received by the aperture 38 formed in the housing 22. The frusto-conical protrusion 54 maintains a small gap (e.g., 0.030 inches) between the mounting surface 52 and perimeter wall 28A. A substantially planar and generally rectangular first clamping surface 56 is spaced from the mounting surface 52 and is substantially parallel thereto. Generally rectangular perimeter walls 58 extend between the first clamping surface 56 and the mounting surface 52 such that the first mounting member 40 has a generally right rectangular-prismatic shape including a length and a width. A through bore 60 extends from the first clamping surface 56 through the mounting member 40 and is surrounded by the frusto-conical protrusion 54.

A semi-circular recess 64 is defined by the first clamping surface 56 and extends through the mounting member 40 generally perpendicularly to the through bore 60. The recess 64 is configured to closely receive the tubing 18 and divides the mounting member 40 into a forward portion 68 and a rearward portion 72. The rearward portion 72 includes the through bore 60 and the frusto-conical protrusion 54, while the forward portion 68 includes a keyslot 76. The keyslot 76 extends through the mounting member 40 generally perpendicularly to the through bore 60 and is recessed with respect to a forward one of the perimeter walls 58. The keyslot 76 terminates in an enlarged circular portion 78.

The second mounting member 42 includes a generally rectangular second clamping surface 80 that opposes the first clamping surface 56 when the mirror assembly 10 is mounted to the vehicle 14. The second clamping surface 80 also defines a substantially semi-circular recess 84 that closely receives the tubing 18 and divides the second mounting member 42 into a forward portion 88 and a rearward portion 92. The forward portion 88 includes a forward surface 96 that is angled with respect to the second clamping surface 80 such that the second mounting member 42 is substantially wedge shaped.

A generally L-shaped arm 100 extends perpendicularly away from the second clamping surface 80, and then extends rearwardly, in a direction substantially parallel to the second clamping surface 80. The L-shaped arm 100 terminates in a substantially cylindrical enlarged portion 104 that is received by the circular portion 78 of the keyslot 76, thereby pivotally connecting the first and second mounting members 40, 42. As shown in FIG. 3, a clamp axis 106 extends longitudinally through the cylindrical enlarged portion 104 and is substantially parallel to the central axis 19 when the clamp assembly 26 is mounted on the round tubing 18.

With reference to FIGS. 3 and 4, the rearward portion 92 of the second mounting member 42 includes a step 108 and a latch-receiving cutout 112 defined in the step 108. The cutout 112 includes a concave cam surface 116 that faces in an opposite direction as the semi-circular recess 84. The second mounting member 42 also includes a through bore 120 that extends from the cam surface 116 to the second clamping surface 80, and that is substantially aligned with the through bore 60 in the first mounting member 40.

The clamp assembly 26 also includes a latch 123 that is pivotally coupled to the second mounting member 42 to effect pivotal movement of the first and second mounting members 40, 42 with respect to each other. The latch 123 includes a generally rectangular handle portion 124 and a pivot tab 128 extending from the handle portion 124. The pivot tab 128 includes a pair of spaced-apart projections 132 having arcuate convex cam surfaces 136. The pivot tab 128 is received by the cutout 112 in the second mounting member 42 such that the convex cam surfaces 136 engage the concave cam surface 116. Each projection 132 includes a relatively small through hole 140 that is substantially perpendicular to the through bore 120 when the latch 123 is pivotally coupled to the second mounting member 42.

Referring to FIGS. 4–6, the clamping assembly 26 also includes a clamping pin 146, having a first end 148 and a second end 150. The first end 148 is received between the projections 132 and a pivot pin 152 extends through the first end 148 and the through holes 140 to pivotally secure the clamping pin 146 to the latch 123. The second end 150 of the clamping pin 146 is externally threaded and extends through the through bores 60, 120 of the mounting members 40, 42 along a pivot axis 154 that is substantially perpendicular to the central axis 19. The second end 150 also extends through the aperture 38 and engages a substantially frusto-conical retaining member 156 that is positioned within the inner chamber 34.

The frusto-conical retaining member 156 includes a large end 158 formed to include a lip 160 and a small end 162 that defines a nut-receiving recess 164. The lip 160 is sonically welded to the perimeter wall 28A of the mirror housing 22 and includes a portion that is received by the aperture 38 to positively locate the retaining member 156. Other methods of coupling the frusto-conical retaining member 156 to the housing 22 so that they do not rotate relative to each other could be used. The nut-receiving recess 164 receives two compression washers 165 and a nut 166 (or substantially any other suitable threaded fastener, e.g. a threaded plate that engages the small end 162 so that it cannot rotate with respect to the frusto-conical retaining member 156 could be used, etc.) in a manner such that rotation of the nut 166 with respect to the retaining member 156 is prohibited. The second end 150 of the clamping pin 146 threadably engages the nut 166 such that the housing 22 and the first and second mounting members 40, 42 are captured between the retaining member 156 and the latch 123, which are coupled to each other by the clamping pin 146.

The latch 123 is moveable between a latched position (shown in FIG. 5) and an unlatched position (shown in FIG. 6). When the latch 123 is in the latched position, the mirror assembly 10 is substantially rigidly and non-movably secured to the tubing 18. Specifically, when the latch 123 is in the latched position, the convex cam surfaces 136 engage the concave cam surface 116, thereby drawing the retaining member 156 toward the latch 123. As the retaining member 156 is drawn toward the latch 123, the semi-circular recesses 64, 84 are drawn snugly against the tubing 18 and the frusto-conical protrusion 54 is drawn snugly into the frusto-conical retaining member 156. Frictional engagement between the semi-circular recesses 64, 84 and the tubing 18, and between the outer surface of the frusto-conical protrusion 54 and the inner surface of the frusto-conical retaining member 156 secures the mirror housing 22 in a substantially fixed position with respect to the tubing 18.

With respect to FIGS. 4 and 6, when the latch 123 is moved into the unlatched position, the convex cam surfaces 136 are moved out of engagement with the concave cam surface 116, allowing the second mounting member 42 to pivot with respect to the first mounting member 40 about the clamp axis 106 such that the semi-circular recesses 64, 84 disengage the tubing 18 and the frusto-conical retaining member 156 disengages the frusto-conical protrusion 54. When the latch 123 is moved into the unlatched position, the assembly 10 remains coupled to the tubing 18, but the assembly 10 is movable with respect to the tubing 18 to adjust the viewing position of the mirror 24. Specifically, when the latch 123 is in the unlatched position, the mirror assembly 10 can be pivoted about the central axis 19, and is also movable along the tubing 18 in a direction that is substantially parallel to the central axis 19. Furthermore, the configuration of the clamp assembly 26 and the mirror housing 22 allows the mirror housing 22 to be pivoted about the pivot axis 154, which, as described above, is substantially perpendicular to the central axis 19. In this way, the mirror 24 can be adjusted to a substantially infinite number of viewing positions by moving the latch 123 to the unlatched position and adjusting the mirror 24 as desired. Once a desired viewing position is established, the latch 123 can be moved back to the latched position to rigidly fix the clamp assembly 26 to the tube 18 and secure the mirror 24 in the desired viewing position.

The embodiments described above and illustrated in the drawings are presented by way of example only and are not intended as a limitation upon the concepts and principles of the present invention. As such, it will be appreciated by one having ordinary skill in the art, that various changes in the elements and their configuration and arrangement are possible without departing from the spirit and scope of the present invention as set forth in the appended claims. Also, the functions of the various elements and assemblies of the present invention can be changed to a significant degree without departing from the spirit and scope of the present invention.

What is claimed is:

1. A mirror assembly for a vehicle, the mirror assembly being securable to a tubular member that defines a central axis and is secured to the vehicle, the mirror assembly comprising:
    a clamping assembly including a concave surface that is engageable with the tubular member;
    a housing coupled to the clamping assembly and supporting a mirror; and
    a latching assembly engaging the clamping assembly and the housing and being movable between a latched position wherein the housing is held substantially fixed with respect to the tubular member, and an unlatched position wherein the clamping assembly is movable in a direction substantially parallel to the central axis and is pivotable about the central axis, and the housing is pivotable with respect to the clamping assembly about a pivot axis that is substantially perpendicular to the central axis.

2. The mirror assembly of claim 1, wherein the clamping assembly includes a first clamp and a second clamp pivotally coupled to each other along a clamp axis that is substantially parallel to and spaced from the central axis.

3. The mirror assembly of claim 2, wherein moving the latching assembly between the latched position and unlatched position pivots the first clamp and the second clamp toward and away from each other about the clamp axis.

4. The mirror assembly of claim 2, wherein the concave surface is defined by the first clamp and the second clamp defines a second concave surface, the first and second concave surfaces cooperating to frictionally engage the tubular member when the latching assembly is in the latched position.

5. The mirror assembly of claim 2, further comprising an elongated locking member extending through the clamping assembly and having a first end pivotably coupled to the latching assembly and a second end coupled to the housing.

6. The mirror assembly of claim 1, wherein the housing includes a frusto-conical cup and the clamping assembly includes a frusto-conical protrusion, the protrusion engaging an inner surface of the cup, the pivot axis extending axially through the frusto-conical cup and the frusto-conical protrusion.

7. The mirror assembly of claim 6, wherein pivoting the housing with respect to the clamping assembly about the pivot axis includes pivoting the frusto-conical cup.

8. The mirror assembly of claim 6, wherein when the latch assembly is in the latched position the protrusion lockingly engages the cup and wherein when the latch assembly is in the unlatched position the protrusion pivotably engages the cup.

9. The mirror assembly of claim 1, wherein the latching assembly includes a cam protrusion and the clamping assembly includes a cam recess adapted to cooperate with the cam protrusion, and wherein when the latching assembly is moved from the unlatched position toward the latched position the cam protrusion and the cam recess cooperate to engage the concave surface with the tubular member.

10. The mirror assembly of claim 1, wherein the latching assembly pivots about a pin axis, the pin axis being substantially perpendicular to the pivot axis.

11. A mirror assembly securable to a tubular member of a vehicle exterior, the assembly comprising:
 a housing supporting a mirror;
 a first mounting member rotatably coupled to the housing for rotation about a pivot axis, the first mounting member including a first concave surface opening away from the housing;
 a second mounting member pivotally coupled to the first mounting member for pivotal movement about a clamp axis, the clamp axis being substantially perpendicular to the pivot axis, the second mounting member including a second concave surface opposed to the first concave surface, the first and second concave surfaces adapted to at least partially surround the tubular member;
 an elongated locking member extending through the first and second mounting members and having a first end secured to the housing and a second end; and
 a latch pivotally coupled to the second end of the elongated locking member, the latch being movable between a latched position, wherein the housing is substantially fixed with respect to the tubular member, and an unlatched position wherein the housing is movable with respect to the tubular member.

12. The mirror assembly of claim 11, wherein the tubular member defines a central axis and the mirror assembly is pivotable about the central axis when the latch is in the unlatched position.

13. The mirror assembly of claim 11, wherein the tubular member defines a central axis and the first and second mounting members are movable in a direction substantially parallel to the central axis when the latch is in the unlatched position.

14. The mirror assembly of claim 11, wherein the tubular member defines a central axis and the housing is pivotable with respect to the first mounting member about a pivot axis that is substantially perpendicular to the central axis when the latch is in the unlatched position.

15. The mirror assembly of claim 11, wherein the elongated locking member is substantially aligned with the pivot axis, and wherein the latch pivots about a pin axis, the pin axis being substantially perpendicular to the pivot axis.

16. The mirror assembly of claim 11, wherein the latch includes a cam protrusion and the second mounting member includes a cam recess contoured to receive the cam protrusion in mating engagement, and wherein when the latch is moved from the unlatched position toward the latched position, the cam protrusion and cam recess cooperate to draw the second mounting member toward the housing, securing the first mounting member therebetween.

17. The mirror assembly of claim 11, wherein the housing includes a frusto-conical cup having a narrow end and an enlarged end aligned along the pivot axis, the elongated locking member engaging the narrow end and the enlarged end engaging an inner surface of the housing.

18. The mirror assembly of claim 17, wherein the first mounting member includes a frusto-conical protrusion on a side opposite the concave recess, the protrusion extending through a hole defined in the housing and being at least partially surrounded by the cup.

19. A method of securing a mirror assembly to a vehicle having a tubular member that defines a central axis, the mirror assembly including a clamping assembly that is engageable with the tubular member, a housing coupled to the clamping assembly and supporting a mirror, and a latch assembly, the method comprising:
 moving the latch assembly into a latched position and holding the housing substantially fixed with respect to the tubular member; and
 moving the latch assembly into an unlatched position and adjusting the mirror with respect to the vehicle, adjusting the mirror including moving the clamping assembly in a direction substantially parallel to the central axis, pivoting the clamping assembly about the central axis, and pivoting the housing with respect to the clamping assembly about a pin axis that is substantially perpendicular to the central axis;
 wherein the clamping assembly includes a first clamp and a second clamp coupled to each other along a clamp axis, and wherein moving the latch assembly into the unlatched position includes pivoting the first clamp and second clamp toward and away from each other about the clamp axis.

20. A method of securing a mirror assembly to a vehicle having a tubular member that defines a central axis, the mirror assembly including a clamping assembly that is engageable with the tubular member, a housing coupled to the clamping assembly and supporting a mirror, and a latch assembly, the method comprising:
 moving the latch assembly into a latched position and holding the housing substantially fixed with respect to the tubular member; and
 moving the latch assembly into an unlatched position and adjusting the mirror with respect to the vehicle, adjusting the mirror including moving the clamping assembly in a direction substantially parallel to the central axis, pivoting the clamping assembly about the central axis, and pivoting the housing with respect to the clamping assembly about a pin axis that is substantially perpendicular to the central axis;
 wherein the clamping assembly includes a first clamp and a second clamp coupled to each other along a clamp axis that is substantially parallel to and spaced apart from the central axis, and wherein moving the latch assembly into the unlatched position includes pivoting the first clamp and second clamp toward and away from each other about the clamp axis.

21. A method of securing a mirror assembly to a vehicle having a tubular member that defines a central axis, the mirror assembly including a clamping assembly that is engageable with the tubular member, a housing coupled to the clamping assembly and supporting a mirror, and a latch assembly, the method comprising:

moving the latch assembly into a latched position and holding the housing substantially fixed with respect to the tubular member; and moving the latch assembly into an unlatched position and adjusting the mirror with respect to the vehicle, adjusting the mirror including moving the clamping assembly in a direction substantially parallel to the central axis, pivoting the clamping assembly about the central axis, and pivoting the housing with respect to the clamping assembly about a pin axis that is substantially perpendicular to the central axis;

wherein the clamping assembly includes a first clamp defining a first concave surface and a second clamp defining a second concave surface, and wherein moving the latch assembly into the latched position includes surrounding and frictionally engaging the tubular member with the first concave surface and the second concave surface.

22. A method of securing a mirror assembly to a vehicle having a tubular member that defines a central axis, the mirror assembly including a clamping assembly that is engageable with the tubular member, a housing coupled to the clamping assembly and supporting a mirror, and a latch assembly, the method comprising:

moving the latch assembly into a latched position and holding the housing substantially fixed with respect to the tubular member; and moving the latch assembly into an unlatched position and adjusting the mirror with respect to the vehicle, adjusting the mirror including moving the clamping assembly in a direction substantially parallel to the central axis, pivoting the clamping assembly about the central axis, and pivoting the housing with respect to the clamping assembly about a pin axis that is substantially perpendicular to the central axis;

wherein the latching assembly includes a cam protrusion and the clamping assembly includes a cam recess adapted to cooperate with the cam protrusion, and wherein moving the latch assembly into the latched position includes moving the cam protrusion into engagement with the cam recess.

23. A method of securing a mirror assembly to a vehicle having a tubular member that defines a central axis, the mirror assembly including a clamping assembly that is engageable with the tubular member, a housing coupled to the clamping assembly and supporting a mirror, and a latch assembly, the method comprising:

moving the latch assembly into a latched position and holding the housing substantially fixed with respect to the tubular member; and moving the latch assembly into an unlatched position and adjusting the mirror with respect to the vehicle, adjusting the mirror including moving the clamping assembly in a direction substantially parallel to the central axis, pivoting the clamping assembly about the central axis, and pivoting the housing with respect to the clamping assembly about a pin axis that is substantially perpendicular to the central axis;

wherein the housing includes a frusto-conical cup and the clamping assembly includes a frusto-conical protrusion, a narrow end of the protrusion engaging an inner surface of the cup, the pivot axis extending axially through the frusto-conical cup and the frusto-conical protrusion, and wherein pivoting the housing with respect to the clamping assembly includes pivoting the frusto-conical cup about the pivot axis.

* * * * *